United States Patent [19]
Meinzer

[11] 3,959,741
[45] May 25, 1976

[54] INTERHALOGEN BASED COMBUSTION-DRIVEN LASER WHICH PROVIDES CONTINUOUS WAVE OUTPUT LASING FROM DUAL SPECIES

[75] Inventor: Richard A. Meinzer, Rocky Hill, Conn.

[73] Assignee: United Technologies Corporation, Hartford, Conn.

[22] Filed: June 9, 1975

[21] Appl. No.: 585,274

[52] U.S. Cl. ............................. 331/94.5 G; 330/4.3
[51] Int. Cl.² .......................................... H01S 3/22
[58] Field of Search ..................... 331/94.5; 330/4.3

[56] References Cited
UNITED STATES PATENTS

| | | | |
|---|---|---|---|
| 3,560,876 | 2/1971 | Airey | 331/94.5 |
| 3,701,045 | 10/1972 | Bronfin et al. | 331/94.5 |
| 3,818,374 | 6/1974 | Emanuel | 331/94.5 |
| 3,906,395 | 9/1975 | Kompa et al. | 331/94.5 |
| 3,928,821 | 12/1975 | Gregg et al. | 331/94.5 |

Primary Examiner—William L. Sikes
Attorney, Agent, or Firm—Anthony J. Criso

[57] ABSTRACT

A chain reaction laser system which operates with two species lasing simultaneously is disclosed. The laser is combustion-driven and provides an output of continuous wave radiation. A fluorine interhalogen and atomic fluorine are mixed together with hydrogen to induce chemical reactions which provide two species of hydrogen halides which are vibrationally excited as well as atomic hydrogen and atomic fluorine. The latter, atomic fluorine, is then available to react with additional hydrogen in a chain reaction sequence. The various preferred reactants and two preferred structures are discussed. In a first embodiment the fluorine interhalogen and atomic fluorine which are both essential to the operation of the invention are both formed as they are needed in a reaction region at relatively high temperature and pressure. In a second embodiment one reactant is formed under conditions of relatively high temperature and pressure and the other at low temperature and pressure conditions.

7 Claims, 2 Drawing Figures

INTERHALOGEN BASED COMBUSTION-DRIVEN LASER WHICH PROVIDES CONTINUOUS WAVE OUTPUT LASING FROM DUAL SPECIES

BACKGROUND OF THE INVENTION

1. Field of Invention

The present invention relates to methods of operating laser systems and more particularly to methods for operating a gas laser with dual species.

2. Description of the Prior Art

In their paper entitled Chemical Lasers From The Reactions Of ClF And $ClF_3$ With $H_2$ And $CH_4$: A Possible Chain Branching Chemical Laser, the Journal of Chemical Physics, Vol. 56, No. 2, Jan. 15, 1972, pages 969–975, O. D. Krogh et al., describe various laser systems based on the atomic fluorine reactions. Various elements when subjected to flash photolysis provide the fluorine required in such systems, however, the source materials involved are highly reactive and difficult to control. Also, the flash photolysis technique for providing the atomic fluorine limits the operation of such systems fo a pulsed output. Alternatively, pulsed discharge or glow discharge techniques have been used to provide the atomic fluorine and provide laser emission from hydrogen fluoride and hydrogen chloride. As a practical matter, such discharge systems include various operating limitations such as the production of undesired chemical species by the electric discharges, the requirement for an external source of electrical power and an inability to produce a continuous wave output.

U.S. Pat. No. 3,818,374 entitled Chain Reaction HCL Chemical Laser, issued to George Emmanuel on June 18, 1974, teaches a chemical laser having a continuous wave output which is chemically driven thereby avoiding the need for an external source of electrical power as in Krogh et al. In the Emmanuel device, fluorine, chlorine and hydrogen are mixed in a chamber wherein the fluorine and hydrogen react chemically, producing heat thereby causing some of the chlorine to dissociate into atoms. The combustion products are expanded and admixed with hydrogen which in turn reacts with the atomic chlorine, producing hydrogen chloride and atomic hydrogen. Subsequently, the atomic hydrogen reacts with the molecular chlorine forming both excited hydrogen chloride which lases, and additional atomic chlorine which is free to react with the molecular hydrogen and continue the chain reaction. The wavelength of the output beam is characteristic of either the hydrogen chloride or deuterium chloride molecule depending upon whether hydrogen or deuterium is admixed with the supersonic stream of chlorine.

J. R. Airey discloses a chemical laser requiring no external energy source for operation in U.S. Pat. No. 3,560,876 entitled Supersonic Flow Gaseous Chemical Laser which issued on Feb. 2, 1971. In essence, hydrogen and chlorine are reacted and the heat of combustion is used to dissociate molecular fluorine. Then the atomic fluorine is mixed with the products of combustion which include hydrogen chloride, permitting the substitution reaction wherein fluorine replaces the chlorine to form excited hydrogen fluoride which provides the source of laser output radiation.

In U.S. Pat. No. 3,701,045 issued Oct. 24, 1972 and entitled Chemical Mixing Laser, Bronfin et al describe a chemical laser wherein two primary reactants under combustion produce free atoms which are subsequently combined with secondary reactants to produce a single lasing species such as HF or HCL. The system requires no external energy source and does operate on a continuous wave basis.

SUMMARY OF THE INVENTION

An object of the present invention is to operate a chemical laser having two active species which provide a continuous wave output.

According to the present invention, a chemical laser is operated on a continuous basis with two discrete lasing species by providing molecules of a fluorine interhalogen and atoms of fluorine under conditions of thermodynamic equilibrium, reacting these materials with hydrogen to form a vibrationally excited hydrogen fluoride and a hydrogen halide, and passing these vibrationally excited materials through an optical cavity to produce laser energy having radiation wavelengths characteristic of the hydrogen fluoride and the hydrogen halide. As used herein with respect to the present invention the word hydrogen means the first element from the periodic tables having an atomic weight and number of one or its isotope having an atomic weight of two or any mixture of these isotopes. Similarly, the word halogen means any element or any isotope is isotopic mixture thereof from Group VII of the periodic table.

In one embodiment molecules of fluorine and chlorine, for example, are mixed in a first reaction region and undergo combustion to form chlorine fluoride and atomic fluorine according to the reaction $$F_2 + \tfrac{1}{2}Cl_2 \rightarrow ClF + F$$

The fluoride and free fluorine are formed at thermal equilibrium under conditions of relatively high temperature and pressure and are then quickly expanded to a lower temperature and pressure. Next, molecular hydrogen is admixed in a second reaction region to form vibrationally excited hydrogen fluoride and hydrogen chloride according to the chain reactions

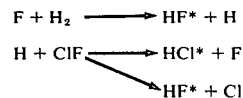

wherein the asterisk molecules are vibrationally excited. The vibrationally excited molecules provide the output laser radiation on passage through an appropriate optical cavity. In an alternate embodiment, hydrogen fluoride and atomic fluorine are formed in the first reaction region by combusting molecular fluorine with a fuel such as hydrogen according to the reaction $$2F_2 + \tfrac{1}{2}H_2 \rightarrow HF + F + F_2$$

and expanded. Then molecular chlorine and hydrogen are admixed with this supersonic stream, to produce chloride fluoride and atomic fluorine according to the reactions $$Cl_2 + F_2 \rightarrow 2ClF$$

$$\tfrac{1}{2}Cl_2 + F \rightarrow ClF$$

The molecular hydrogen combines with the fluorine atoms according to the reaction $$H_2 + F \rightarrow HF^* + H$$

thereby providing atomic hydrogen which combines with the chlorine fluoride according to the reaction $$H + ClF \rightleftharpoons HCl^* + F$$
$$HF^* + Cl$$

The present invention allows the laser system to be operated with the energy released from chemical reactions. The system produces a continuous wave output of laser radiation with two laser species, namely, a hydrogen halide and hydrogen fluoride lasing simultaneously. The wavelengths of the output beam are in the general range of two to six microns. The reactants involved undergo a chain reaction so that the laser runs continuously provided that reactants are supplied.

The method of operating a laser as described herein allows a completely self-contained system having no requirement for externally supplied electrical power or photolytic dissociation. The prime reactants, namely, a fluorine interhalogen and atomic fluorine are generally produced thermally in a combustion chamber in systems which provide continuous output of laser radiation at a high level of power.

The foregoing and other objects, features and advantages of the present invention will become more apparent in the light of the following detailed description of a preferred embodiment thereof as shown in the accompanying drawing.

DESCRIPTION OF THE PREFERRED EMBODIMENT

Figure 1:
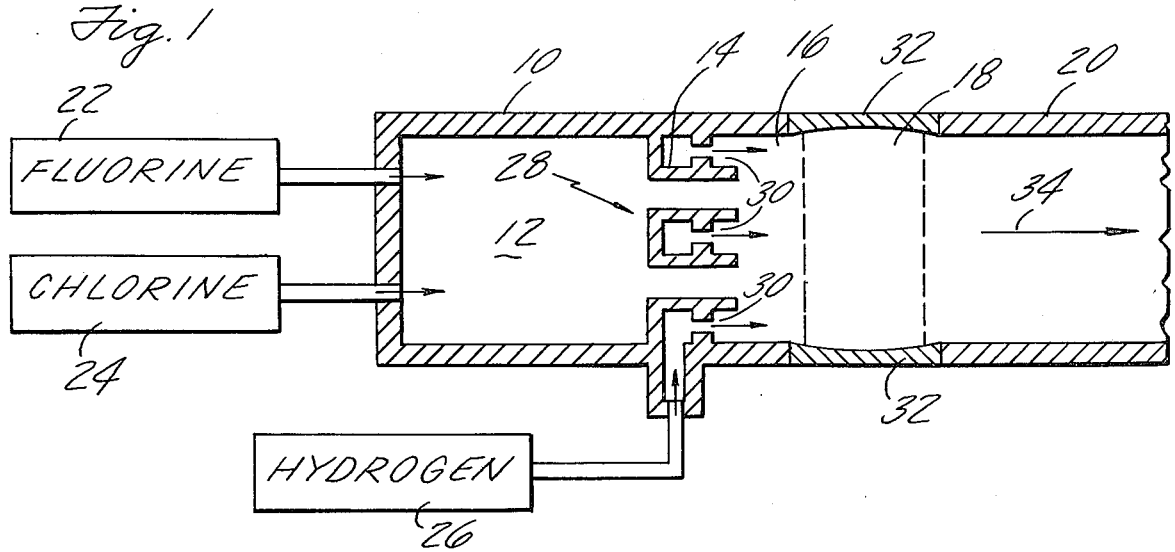
FIG. 1 is a simplified sketch showing the principal elements and reactants used in the practice of the present invention.

A simple embodiment of the present invention is shown in FIG. 1 wherein an outer housing 10 forms a first reaction region 12, a nozzle region 14, a second reaction region 16, an optical cavity 18 and an exhaust region 20. A fluorine source 22 and a chlorine source 24 provide fresh reactants to the first reaction zone. Similarly, a hydrogen source 26 provides hydrogen to the nozzle region.

Operation of the device shown in FIG. 1 includes providing a continuous supply of fluorine and chlorine to the first reaction zone in appropriate proportions so that the fluorine and chlorine react with each other to form chlorine fluoride and atomic fluorine according to the reaction $$F_2 + \tfrac{1}{2}Cl_2 \rightarrow ClF + F$$

which in turn are expanded through an array 28 of nozzle assemblies having secondary injection means 30. The chemical activity in the first reaction zone is exothermic resulting in a mixture of gases at high temperature and pressure at thermodynamic equilibrium in the first reaction zone which is typically at 1,000° Kelvin and two atmospheres. The hot gases are then expanded rapidly through the nozzle array to the second reaction zone which is typically at 10 torr and 300° Kelvin and molecular hydrogen from the hydrogen source 26 is admixed through the secondary injection means 30 with the stream in a manner which produces intimate mixing between the hydrogen and the expanded gases. In the second reaction zone, additional chemical reaction takes place between the atomic fluorine and the freshly admixed molecular hydrogen to provide vibrationally excited hydrogen fluoride and free hydrogen atoms. The free hydrogen atoms in turn combine with the chlorine fluoride to produce vibrationally excited hydrogen chloride and free fluorine atoms according to the reactions $$F + H_2 \rightarrow HF^* + H$$
$$H + ClF \rightleftharpoons HCl^* + F$$
$$HF^* + Cl$$

The free fluorine produced from the hydrogen/chlorine fluoride reaction are additional to the free fluorine atoms that were produced in the first reaction zone and these additional fluorine atoms are free to combine with the hydrogen from the secondary injection means to provide additional excited hydrogen fluoride in what is considered a chain reaction. The excited hydrogen fluoride and hydrogen chloride are then passed through the optical cavity which is shown as formed by a pair 32 of mirrors. The effluent from the optical cavity flowing in a downstream direction 34 is then exhausted from the housing.

The atomic hydrogen and the chlorine fluoride can interact and form either excited hydrogen chloride or hydrogen fluoride as is shown by the above equations. In the operation of the present invention the formation of hydrogen chloride is preferred since it also results in free fluorine which is then available to react with molecular hydrogen as shown and sustain the chain reaction. Present analysis indicates that the rate of formation of vibrationally excited hydrogen chloride from the interhalogen molecule is approximately equal to the rate of formation of hydrogen fluoride. Conveniently, the subsequent reaction of the chlorine atoms so formed with molecular hydrogen to produce nonexcited hydrogen chloride is not very significant because the reaction is endothermic and relatively slow at the static gas temperature of approximately 300° Kelvin at which this laser operates. Similarly, other competing reactions such as that of atomic fluorine with hydrogen chloride to produce hydrogen fluoride and free chlorine proceed at a rate which is insignificant compared with the main reactions desired. Although some of these reactions have not been characterized experimentally, theoretical modeling estimates, which were correlated with experimental measurements, have been used in making this analysis.

The chemical reaction between fluorine and chlorine molecules as is required in the first reaction zone of the system shown in FIG. 1 is not hypergollic at the operating conditions normally used for a laser. Therefore, the reaction is initiated by techniques such as the addition of a fuel which is hypergollic. The addition of a small quantity of hydrogen is suitable for this purpose since it reacts spontaneously with fluorine and releases a sufficient amount of heat to allow the exothermic chlorine/fluorine reaction to be initiated. Once the latter reaction is initiated, the initiation mechanism is eliminated and the reaction becomes self sustaining.

An apparatus very similar to that described above and shown in FIG. 2 includes essentially the same physical structure as previously described with the chlorine source 24 supplying molecular chlorine directly to the secondary injection means 30 together with the hydrogen source 26 to provide a continuous supply of fresh reactants into the secondary reaction zone. A fuel source 36 is connected directly to the first reaction zone.

Figure 2:
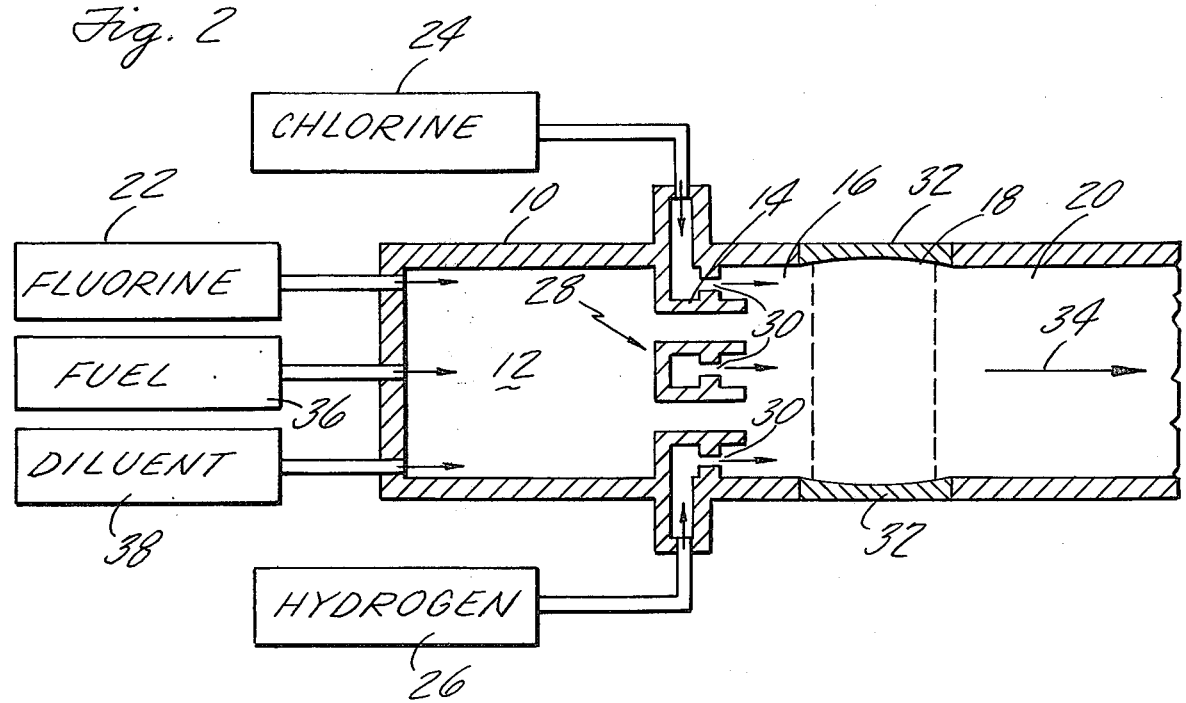
FIG. 2 is a simplified sketch showing an alternate embodiment which uses an arbitrary fuel in the combustion chamber.

In the operation of the apparatus shown in FIG. 2, molecular fluorine from the fluorine source 22 and a fuel such as hydrogen are fed into the first reaction zone where they undergo a chemical reaction releasing heat and thereby providing both an equilibrium mixture of gases at relatively high temperature and pressure in the first reaction zone. The fuel can be any fuel which is used in a conventional hydrogen fluoride laser such as is described on pages six through eleven in the Final Report For Study And Demonstration Of Liquid And Gaseous Reactants For Advanced Chemical Lasers, Prepared for Naval Surface Weapons Center, White Oak, Silver Spring, Md., under Contract N60921–74–C–0372, April 1975 by E. A. Burns. As a practical matter benzene ($C_6H_6$), carbon disulfide ($CS_2$) and tetrafluoroethylene ($C_2F_4$) are preferred fuels. The fluorine and fuel combine with one another to produce hydrogen fluoride, free fluorine atoms and molecular fluorine according to the reaction $$2F_2 + \tfrac{1}{2}H_2 \rightarrow HF + F + F_2$$

These materials are rapidly expanded through the nozzle array to a condition of lower temperature and pressure by a procedure commonly referred to as "freezing" to prevent the free atoms of fluorine from recombining into molecular fluorine. Molecular hydrogen and chlorine are continuously admixed with the expanded materials in a second reaction zone to first product chlorine fluoride and atomic fluorine according to the reactions $$\tfrac{1}{2}Cl_2 + F_2 \rightarrow ClF + F$$

$$\tfrac{1}{2}Cl_2 + F \rightarrow ClF$$

which is an intermediate step leading to the ultimate production of vibrationally excited hydrogen fluoride and hydrogen chloride according to the reactions

The free fluorine produced by the reaction of atomic hydrogen and chlorine fluoride is available to combine with molecular hydrogen in accordance with the reaction shown above and continue the chemical reaction in what is commonly referred to as a chain reaction.

Although the operations of the above embodiments are described on the basis of chlorine fluoride and atomic fluorine, any fluorine interhalogen an theoretically be substituted for the chlorine fluoride. The more practical substitutions are bromine fluoride and iodine fluoride and a summary describing the various reactions and their corresponding lasing species is given in Table 1.

TABLE 1

| Primary Reaction Zone | Secondary Reaction Zone |
|---|---|
| $F_2 + \tfrac{1}{2}Cl_2 \longrightarrow ClF + F$ | $F + H_2 \longrightarrow HF^* + H$<br>$H + ClF \longrightarrow HCl^* + F$<br>$\phantom{H + ClF \longrightarrow} HF^* + Cl$ |
| $F_2 + \tfrac{1}{2}Br_2 \longrightarrow BrF + F$ | $F + H_2 \longrightarrow HF^* + H$<br>$H + BrF \longrightarrow HBr^* + F$<br>$\phantom{H + BrF \longrightarrow} HF^* + Br$ |
| $F_2 + \tfrac{1}{2}I_2 \longrightarrow IF + F$ | $F + H_2 \longrightarrow HF^* + H$<br>$H + IF \longrightarrow HI^* + F$<br>$\phantom{H + IF \longrightarrow} HF^* + I$ |

A diluent source 36 is shown in FIG. 2. The diluent is usually a gas such as helium, argon, carbon tetrafluoride or nitrogen which is injected into the first reaction zone in order to control the temperature in this region. Although the diluent source is shown only in the second embodiment described above, its use is equally applicable to the first embodiment as well. Similarly, a diluent may be added to the secondary hydrogen to aid in the control of the static gas temperature.

The following data were obtained from specific embodiments of the present invention as are described in greater detail in the report Investigation Of A Combustion-Driven Chain Reaction HCl Laser, Prepared for ONR, Department of the Navy, Arlington, Va., under Contract N00014–74–C–0377, May 1975 by R. A. Meinzer et al. An output beam containing 400 watts of power has been observed with hydrogen chloride and hydrogen fluoride as the lasing species. The specific power of the laser was 43 kilowatt-seconds per pound of the flowing working medium. Computer modeling of the performance for this system indicates that significant improvements in this laser output are possible including operating the system with a static pressure in excess of 50 torr in the optical cavity.

Although this invention has been shown and described with respect to preferred embodiments thereof, it should be understood by those skilled in the art that various changes and omissions in the form and detail thereof may be made therein without departing from the spirit and scope of the invention.

Having thus described typical embodiments of my invention, that which I claim as new and desire to secure by Letters Patent of the United States is:

1. A method of producing continuous radiation in a laser system having two discrete species lasing simultaneously including the steps of:
   providing a flow of gas which includes atoms of fluorine and a gas selected from the fluorine interhalogen group consisting of chlorine fluoride, bromine fluoride and iodine fluoride;
   admixing molecular hydrogen to the flow to allow the atomic fluorine to react with the hydrogen and from vibrationally excited hydrogen fluoride and atomic hydrogen;
   reacting the fluorine interhalogen with the atomic hydrogen to form a vibrationally excited hydrogen halide and atomic fluorine; and
   passing the excited hydrogen fluoride and hydrogen halide through an optical cavity to produce an output beam of electromagnetic radiation having wavelengths characteristic of these excited species.

2. The method according to claim 1 wherein molecular fluorine and a halogen selected from the group consisting of chlorine, bromine and iodine are combined in a chemical reaction which releases heat and forms the atomic fluorine and the fluorine interhalogen.

3. The invention according to claim 2 wherein the atomic fluorine produced in the reaction between the fluorine interhalogen and the atomic hydrogen react with admixed molecular hydrogen to form additional vibrationally excited hydrogen fluoride and atomic hydrogen.

4. A method of producing continuous radiation in a laser having two discrete species lasing simultaneously including the steps of:

forming a mixture of molecular chlorine fluoride and atomic fluorine at thermal equilibrium by combusting reactants in a first reaction region;

expanding the mixture to lower the temperature and pressure of the mixture;

admixing molecular hydrogen with the expanded mixture to form vibrationally excited hydrogen fluoride and hydrogen chloride molecules; and passing the excited molecules through an optical cavity to produce an output beam of electromagnetic radiation having wavelengths which are characteristic of hydrogen fluoride and hydrogen chloride molecules.

5. The invention according to claim 4 wherein the reactants combusted comprise molecules of fluorine, chlorine and hydrogen.

6. The invention according to claim 4 wherein the mixture of molecular chlorine fluoride and atomic fluorine is formed by combusting molecular fluorine with a fuel in the first reaction region to form atomic fluorine, and admixing molecular chlorine and hydrogen with the atomic fluorine in the second reaction region.

7. The invention according to claim 6 wherein the fuel is selected from the group consisting of hydrogen, carbon disulfide, tetrafluoroethylene, and benzene.

* * * * *

UNITED STATES PATENT OFFICE
CERTIFICATE OF CORRECTION

PATENT NO. : 3,959,741
DATED : May 25, 1976
INVENTOR(S) : RICHARD A. MEINZER

It is certified that error appears in the above-identified patent and that said Letters Patent are hereby corrected as shown below:

Column 1, line 23,        "fo" should read -- to --

Column 2, line 26,        "is" should read -- or --

Column 5, line 41,        "product" should read -- produce --

Column 5, line 63,        "an" should read -- can --

Signed and Sealed this

Thirtieth Day of November 1976

[SEAL]

Attest:

RUTH C. MASON
*Attesting Officer*

C. MARSHALL DANN
*Commissioner of Patents and Trademarks*